J. W. HAYS.
STOP COCK.
APPLICATION FILED JULY 13, 1914.

1,137,969.

Patented May 4, 1915.

WITNESSES:

INVENTOR.
Joseph W. Hays.

UNITED STATES PATENT OFFICE.

JOSEPH W. HAYS, OF CHICAGO, ILLINOIS.

STOP-COCK.

1,137,969.  Specification of Letters Patent.  Patented May 4, 1915.

Application filed July 13, 1914. Serial No. 850,620.

*To all whom it may concern:*

Be it known that I, JOSEPH W. HAYS, a citizen of the United States, residing at No. 1518 Lunt avenue, in the city of Chicago, county of Cook, and State of Illinois, have invented certain new and useful Improvements in Stop-Cocks, of which the following is a specification.

My invention relates to stop-cocks in flexible rubber tubing and has a particular application to gas analyzing apparatus and the like, where it is necessary to employ glass pipettes and burettes connected with each other by soft tubing.

It has heretofore been the practice to make use of glass stop-cocks in apparatus of the character mentioned or in lieu of such glass cocks to employ pinch-clamps upon the rubber hose connecting the glass parts. Both methods are objectionable. The glass stop-cocks are liable to set or "freeze" and cause a great deal of trouble. Furthermore they are very fragile and unless properly lubricated at frequent intervals and carefully manipulated they will leak and cause trouble. Pinch-clamps, while in many ways preferable to glass cocks, cause the rubber tubing to flatten permanently and this necessitates renewal of the rubber part. Again the pressure of the clamp is liable to cause the walls of the rubber tube to adhere, thereby closing the tube permanently.

The objects of my improvement are, first, to provide a stop-cock for a rubber tube that will not by constant pressure ruin the rubber tube and second to provide means for preventing the adherence of the walls of the rubber tube.

I attain these objects by the means illustrated in the accompanying drawings, in which—

Figure 1:
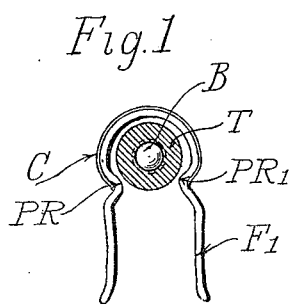
Figure 2:
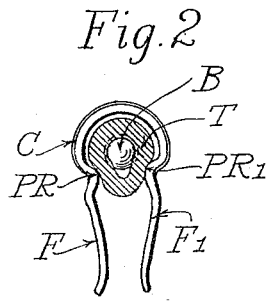
Figure 3:
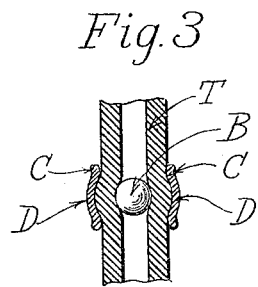

Figure 1 is a cross sectional view of the rubber tube and the stop-cock, the latter being in the "closed" position. Fig. 2 is a cross-sectional view of the rubber tube and the stop-cock, the latter being in the "open" position. Fig. 3 is a sectional view of the rubber tube and stop cock, taken longitudinally with the rubber tube.

Similar letters and figures refer to similar parts throughout the several drawings.

"T," is the rubber tube carrying the stop-cock.

"B," is a small glass ball of slightly larger diameter than the bore of the tube. The ball may be made of any hard substance, but glass is preferred on account of its non-corrosive character.

"C," is a clamp of spring metal, provided with finger-pieces, "F" and "F¹" and with the pressure ridges "PR" and "PR¹." The spring clamp is normally open, that is to say it exerts no pressure upon the rubber tube. The tube is normally closed by the glass ball. When it is desired to open the valve the clamp is compressed by bringing the finger pieces, "F¹" and "F²" toward each other by pressure with the thumb and forefinger. This causes the pressure ridges to engage the rubber tube slightly out of line with its axis and with that of the ball. As a result of this pressure a by-pass is formed around the glass ball and the cock is "opened." On releasing the fingers the clamp springs back to its normal position, the by-pass ceases to exist and the ball again closes the tube. It is essential to prevent the ball from moving in the rubber tube, otherwise it might get out of line with the clamp, it is also essential to prevent the movement of the clamp along the rubber tube, thereby getting out of line with the ball. To this end the spring of the clamp is "dished" or cupped slightly, see "D," Fig. 3. The clamp may be dispensed with and the ball stop-cock operated by a pressure of the fingers direct upon the rubber tubing. This is somewhat awkward, however, and the clamp greatly facilitates the operation of the contrivance.

I claim—

1. A stop valve for a flexible rubber tube consisting of a hard ball within the tube and a spring clamp around the tube, said clamp being provided with pressure ridges running longitudinally with the tube.

2. A stop-valve for a flexible rubber tube consisting of a hard ball within the tube and a spring clamp around the tube, said spring clamp engaging said tube about said ball.

3. A stop-valve for a flexible rubber tube consisting of a hard ball within said tube and a spring clamp around said tube and engaging same on opposite sides thereof on one side of said ball.

JOSEPH W. HAYS.

Witnesses:
HARVEY G. HAYS,
MARCELLA GREENE.

Copies of this patent may be obtained for five cents each, by addressing the "Commissioner of Patents, Washington, D. C."